United States Patent
Wen et al.

(10) Patent No.: US 9,832,621 B2
(45) Date of Patent: Nov. 28, 2017

(54) METHOD, TERMINAL, SERVER, AND SYSTEM FOR AUDIO SIGNAL TRANSMISSION

(71) Applicant: Tencent Technology (Shenzhen) Company Limited, Shenzhen (CN)

(72) Inventors: Xiaomu Wen, Shenzhen (CN); Yongxin Wang, Shenzhen (CN); Fan Yin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 256 days.

(21) Appl. No.: 14/719,144

(22) Filed: May 21, 2015

(65) Prior Publication Data

US 2015/0256988 A1    Sep. 10, 2015

Related U.S. Application Data

(63) Continuation of application No. PCT/CN2013/087653, filed on Nov. 22, 2013.

(30) Foreign Application Priority Data

Nov. 22, 2012    (CN) .......................... 2012 1 0479379

(51) Int. Cl.
*H04W 4/16* (2009.01)
*H04L 12/58* (2006.01)
(Continued)

(52) U.S. Cl.
CPC ............. *H04W 4/16* (2013.01); *H04L 51/046* (2013.01); *H04L 65/1069* (2013.01);
(Continued)

(58) Field of Classification Search
CPC .... H04W 4/16; H04L 65/1069; H04L 51/046; H04M 1/2535; H04M 1/7255
See application file for complete search history.

(56) References Cited

U.S. PATENT DOCUMENTS 7,286,256 B2 * 10/2007 Herbert ............. H04N 1/00132
358/1.15
7,984,098 B2 * 7/2011 Enete .................. H04L 12/1822
709/204
(Continued)

FOREIGN PATENT DOCUMENTS

CN       1516436 A      7/2004
CN       1731718 A      2/2006
(Continued)

OTHER PUBLICATIONS

Tencent, Written Opinion, PCT/CN2013/087653, dated Mar. 6, 2014, 9 pgs.
(Continued)

*Primary Examiner* — Andrew Lai
*Assistant Examiner* — Harry H Kim
(74) *Attorney, Agent, or Firm* — Morgan, Lewis & Bockius LLP

(57) ABSTRACT

Embodiments of the present disclosure provide a real-time voice transmission method and an associated mobile terminal. The method includes: starting collecting voice signal in response to a first user instruction; while collecting the voice signal: encoding and compressing the collected voice signal into voice data; identifying the voice data as a voice data segment and adding a transmission sequence identifier to the voice data segment when the length of voice data reaches a preset data length; generating and displaying a first visual indicator after sending the voice data segment to a voice server; stopping collecting the voice signal in response to a second user instruction; identifying remaining voice data as
(Continued)

a last voice data segment and adding a last transmission sequence identifier to the last voice data segment; and generating and displaying a second visual indicator after sending the last voice data segment to the voice server.

15 Claims, 7 Drawing Sheets

(51) Int. Cl.
*H04L 29/06* (2006.01)
*H04M 1/253* (2006.01)
*H04W 4/12* (2009.01)
*H04M 1/725* (2006.01)

(52) U.S. Cl.
CPC ........ *H04M 1/2535* (2013.01); *H04M 1/7255* (2013.01); *H04W 4/12* (2013.01)

(56) References Cited

U.S. PATENT DOCUMENTS

| | | | |
|---|---|---|---|
| 2010/0004926 A1* | 1/2010 | Neoran | G10L 25/48 704/201 |
| 2010/0220677 A1* | 9/2010 | Li | H04L 1/1835 370/329 |
| 2014/0101551 A1* | 4/2014 | Sherrets | H04N 21/2743 715/723 |

FOREIGN PATENT DOCUMENTS

| | | |
|---|---|---|
| CN | 102624874 A | 8/2012 |
| EP | 2043336 A2 | 4/2009 |

OTHER PUBLICATIONS

Tencent, IPRP, PCT/CN2013/087653, dated May 26, 2015, 6 pgs.
Tencent, ISR, PCT/CN2013/087653, dated Mar. 6, 2014, 4 pgs.

* cited by examiner

METHOD, TERMINAL, SERVER, AND SYSTEM FOR AUDIO SIGNAL TRANSMISSION

RELATED APPLICATIONS

This application is a continuation application of PCT Patent Application No. PCT/CN2013/087653, entitled "METHOD, SYSTEM, AND STORAGE MEDIUM FOR TRACKING AUDIO STREAMING MEDIA" filed on Nov. 22, 2013, which claims priority to Chinese Patent Application No. 201210479379.X, filed with the Chinese Patent Office on Nov. 22, 2012 and entitled "VOICE TRANSMISSION METHOD AND TERMINAL, VOICE SERVER, AND VOICE TRANSMISSION SYSTEM", both of which are incorporated by reference in their entirety.

FIELD OF THE TECHNOLOGY

Embodiments of the present disclosure relate to communications technologies, and in particular, to a voice transmission method and an associated mobile terminal, a voice server, and a voice transmission system.

BACKGROUND OF THE DISCLOSURE

An instant messaging technology is a communications technology that is developed based on the Internet and a mobile communications network. The technology can implement communication in a manner of a video, text, a short message, a voice message, or the like, and has enjoyed wide popularity among users. A voice intercom function is an important voice communication manner in the instant messaging technology. Based on the voice communication manner, a user may have a real-time voice chat, just like a text message chat, so that a requirement of a user for real-time communication is effectively satisfied, and the voice intercom function has found wide application in instant messaging on a mobile phone and other mobile terminals.

In an existing voice intercom technology, voice data is transmitted in a manner of an attachment. Specifically, a process of voice intercommunication between user B1 holding mobile terminal A1 and user B2 holding mobile terminal A2 is as follows: When user B1 sends a voice to user B2, after detecting that user B1 pushes a voice function button, mobile terminal A1 first collects the voice sent when user B1 pushes the button, and ends collection of a voice after detecting that the button is released, next, sequentially encodes and compresses the collected voice to obtain a voice file, and then sends the voice file to voice server C. After receiving the voice file, voice server C forwards the voice file to mobile terminal B1. Mobile terminal B1 sequentially decompresses and decodes the received voice file to obtain the voice, and plays the voice to user B2. Similarly, when user B2 sends a voice to user B1, a same processing manner is used. In this way, voice intercommunication between two mobile terminals may be implemented.

However, in the existing voice transmission process, collection, encoding, and compression of a voice are all completed to obtain an entire voice file and then the entire voice file is sent. Therefore, transmission of voice data requires a long time, resulting in low efficiency of transmission of voice data and undesirable real-time quality of voice transmission. Besides, during transmission of an entire voice file, in an environment of a mobile communications network or another wireless network, voice transmission often fails due to an unstable wireless network, and the entire voice file needs to be retransmitted after the voice transmission fails, which results in high consumption of network resources for retransmission of a voice file and further reduces efficiency of voice transmission and real-time quality of voice transmission. Therefore, a requirement for real-time quality of a voice in the voice intercom technology cannot be satisfied.

SUMMARY

Embodiments of the present disclosure provide a voice transmission method and terminal, a voice server, and a voice transmission system, which can overcome the problems of low transmission efficiency and undesirable real-time quality of voice transmission in voice transmission in a manner of an attachment in an existing voice intercom technology.

An embodiment of the present disclosure provides a real-time voice transmission method performed at a mobile terminal having one or more processors and memory storing program modules to be executed by the one or more processors, the method including:
  starting collecting voice signal in response to a first user instruction;
  while collecting the voice signal:
    encoding and compressing the collected voice signal into voice data;
    identifying the voice data as a voice data segment and adding a transmission sequence identifier to the voice data segment when the length of voice data reaches a preset data length, wherein the transmission sequence identifier indicates a processing order of the voice data segment;
    generating and displaying a first visual indicator after sending the voice data segment to a voice server;
  stopping collecting the voice signal in response to a second user instruction;
  identifying remaining voice data as a last voice data segment and adding a last transmission sequence identifier to the last voice data segment; and
  generating and displaying a second visual indicator after sending the last voice data segment to the voice server.

Another embodiment of the present disclosure further provides a voice transmission terminal, including:
  one or more processors; and
  a memory,
  one or more program modules being stored in the memory, the one or more program modules being configured to be executed by the one or more processors, and the one or more program modules including instructions used for performing the following operations:
    starting collecting voice signal in response to a first user instruction;
    while collecting the voice signal:
      encoding and compressing the collected voice signal into voice data;
      identifying the voice data as a voice data segment and adding a transmission sequence identifier to the voice data segment when the length of voice data reaches a preset data length, wherein the transmission sequence identifier indicates a processing order of the voice data segment;
      generating and displaying a first visual indicator after sending the voice data segment to a voice server;
    stopping collecting the voice signal in response to a second user instruction;

identifying remaining voice data as a last voice data segment and adding a last transmission sequence identifier to the last voice data segment; and generating and displaying a second visual indicator after sending the last voice data segment to the voice server.

Yet another embodiment of the present disclosure further provides a non-transitory computer readable storage medium storing one or more program modules to be executed by one or more processors of a mobile terminal, the one or more program modules comprising instructions used for performing the following operations:

starting collecting voice signal in response to a first user instruction;

while collecting the voice signal:
encoding and compressing the collected voice signal into voice data;
identifying the voice data as a voice data segment and adding a transmission sequence identifier to the voice data segment when the length of voice data reaches a preset data length, wherein the transmission sequence identifier indicates a processing order of the voice data segment;
generating and displaying a first visual indicator after sending the voice data segment to a voice server;

stopping collecting the voice signal in response to a second user instruction;

identifying remaining voice data as a last voice data segment and adding a last transmission sequence identifier to the last voice data segment; and generating and displaying a second visual indicator after sending the last voice data segment to the voice server.

According to the voice transmission method and terminal, the voice server, and the voice transmission system provided by the embodiments of the present disclosure, in a voice signal collection process, voice signal may be processed in real time, and voice data obtained through processing may be sent in real time as a voice data segment of a preset data length. In this way, voice processing and transmission may be performed in the voice signal collection process, so that collection, processing, and transmission of a voice are performed synchronously, thereby improving efficiency of voice transmission and real-time quality of voice transmission. Besides, because a voice is sent in a manner of a voice data segment during transmission, when data transmission fails due to a network failure, for example, an unstable wireless communications network, only a voice data segment that fails to be transmitted needs to be retransmitted, thereby preventing existing problems of high consumption of network resources, low efficiency of voice transmission, and undesirable real-time quality of voice transmission because an entire voice file needs to be retransmitted.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
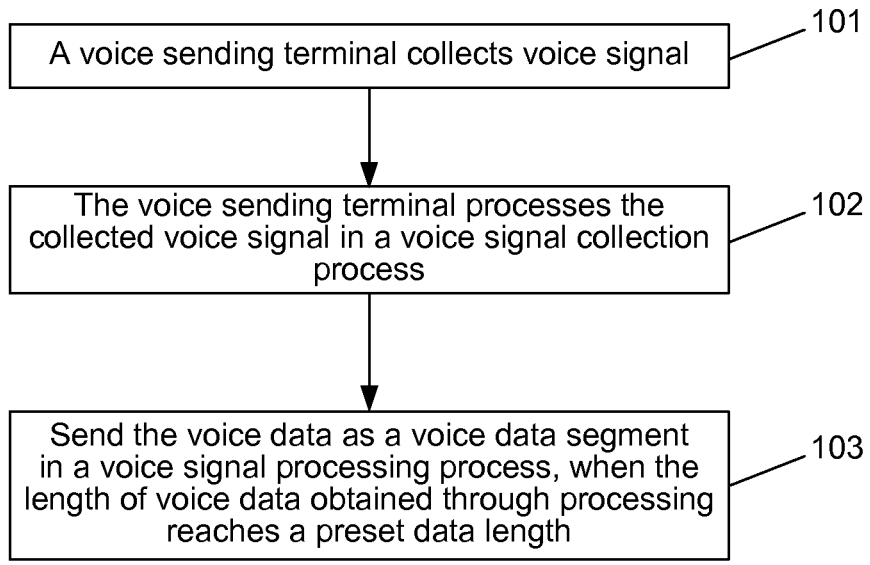
FIG. 1 is a schematic flowchart of a voice transmission method according to an embodiment of the present disclosure.

FIG. 1 is a schematic flowchart of a voice transmission method according to an embodiment of the present disclosure. The voice transmission method in this embodiment is applied to instant messaging, and may implement transmission of voice data in a voice intercommunication process. When user A in a mobile communications network needs to send a voice to user B, user A may push a voice intercom function button on a voice sending terminal held by user A; at this time, the voice sending terminal may process, according to the method in this embodiment, the voice sent by user A. Specifically, as shown in FIG. 1, the method in this embodiment may include the following steps:

Step 101: A voice sending terminal collects voice signal.

Step 102: The voice sending terminal processes the collected voice signal in a voice signal collection process.

Step 103: Send the voice data as a voice data segment in a voice signal processing process, when the length of voice data obtained through processing reaches a preset data length.

In this embodiment, when detecting that user A pushes a voice intercom function button, the voice sending terminal may collect voice signal, process the collected voice signal at the same time in a voice signal collection process, and send, in real time, voice data obtained through processing as a voice data segment of a preset data length to a voice server in a network, until the collection of the voice signal is ended. At the same time, the voice server may forward, in real time, the received voice data segment to a voice receiving terminal held by user B, so that the voice receiving terminal processes the voice data and then presents the voice data to user B, thereby implementing voice transmission during voice intercommunication. Similarly, when user B sends voice data to user A, a same voice transmission process takes place.

Persons skilled in the art may understand that in this embodiment, when voice data is processed, voice signal is processed into voice data segments, which in essence means that a large voice data block is divided into smaller voice data blocks, and therefore, a voice is sent based on smaller voice data blocks.

In this embodiment, the voice sending terminal and the voice receiving terminal may be mobile terminals, for example, mobile phones, based on a mobile communications network, or may be mobile terminals such as tablet computers or notebook computers based on another existing wireless network, for example, a WiFi network, which are not specifically limited in this embodiment of the present disclosure, any terminal capable of instant messaging may be the terminal in this embodiment.

In the voice transmission method provided by this embodiment of the present disclosure, in a voice signal collection process, voice signal may be processed in real time, and voice data obtained through processing may be sent in real time as a voice data segment of a preset data length. In this way, voice processing and transmission may be performed in the voice signal collection process, so that collection, processing, and transmission of a voice are performed synchronously, thereby improving efficiency of voice transmission and real-time quality of voice transmission. Besides, because a voice is sent in a manner of a voice data segment during transmission, when data transmission fails due to a network failure, for example, an unstable wireless communications network, only a voice data segment that fails to be transmitted needs to be retransmitted, thereby preventing existing problems of high consumption of network resources, low efficiency of voice transmission, and undesirable real-time quality of voice transmission because an entire voice file needs to be retransmitted.

Figure 2:
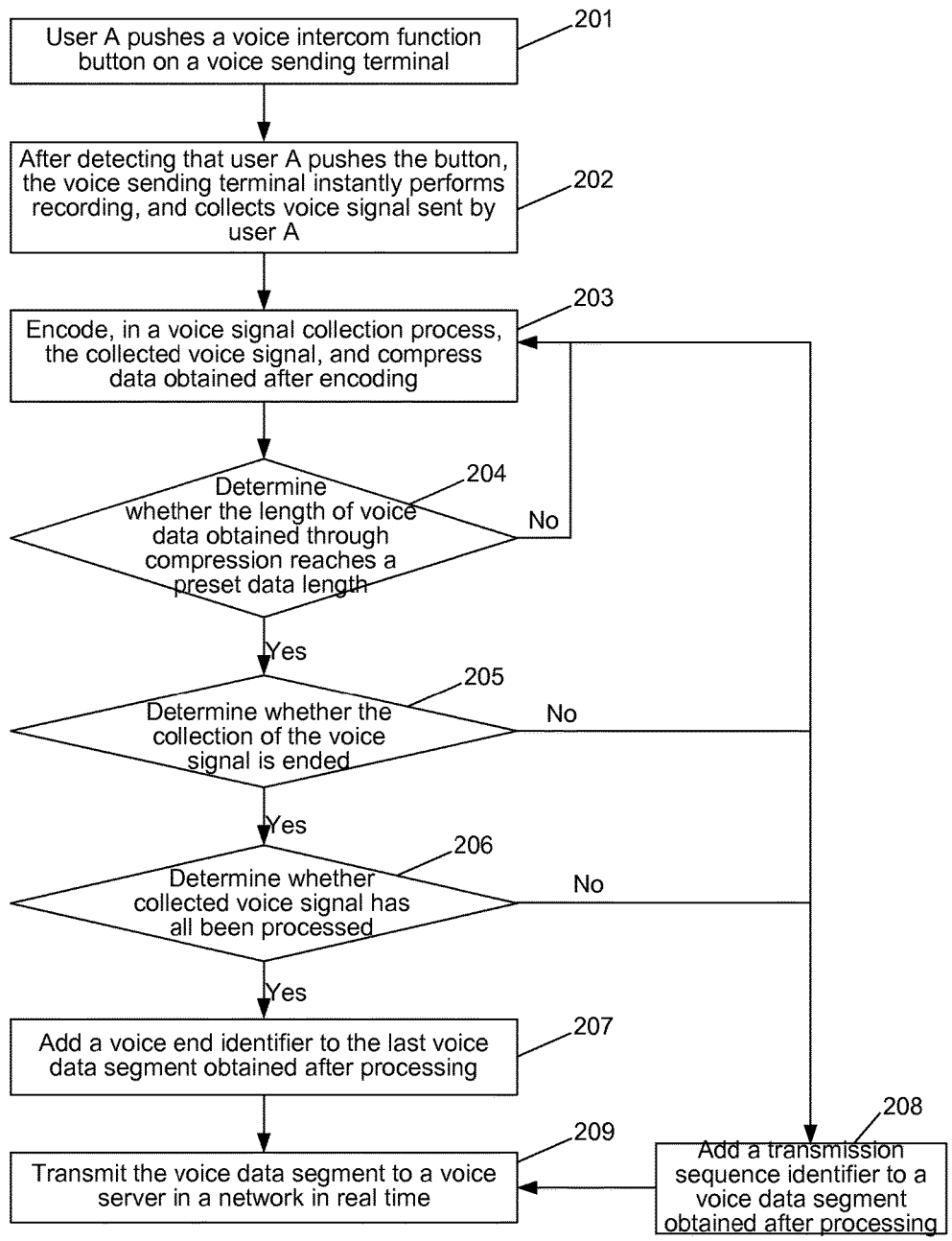
FIG. 2 is a schematic flowchart of a voice transmission method according to another embodiment of the present disclosure.

FIG. 2 is a schematic flowchart of a voice transmission method according to another embodiment of the present disclosure. In this embodiment, when user A sends an intercommunication voice by using a voice sending terminal, the voice sending terminal may add a transmission sequence identifier to a voice data segment obtained through processing, so that a voice receiving terminal receiving the voice data segment may recombine, based on the transmission sequence identifier, the voice data segment. Specifically, as shown in FIG. 2, the method in this embodiment may include the following steps:

Step 201: User A pushes a voice intercom function button on a voice sending terminal, so as to instruct the voice sending terminal to start to send a voice to a voice receiving terminal held by user B.

Step 202: After detecting that user A pushes the button, the voice sending terminal instantly performs recording, and collects voice signal sent by user A, until user A releases the button to instruct the voice sending terminal to stop voice sending.

Step 203: Encode, in a voice signal collection process, the collected voice signal, and compress data obtained after encoding.

Step 204: Determine, in a voice data processing process in step 203, whether the length of voice data obtained through compression reaches a preset data length; if yes, execute step 205; or otherwise, continue to execute step 203.

Step 205: Determine whether the collection of the voice signal is ended; if yes, execute step 206; or otherwise, execute step 203 and step 208.

Step 206: Determine whether collected voice signal has all been processed; if yes, execute step 207; or otherwise, execute step 203 and step 208.

Step 207: Add a voice end identifier to the last voice data segment obtained after processing, and execute step 209.

Step 208: Add a transmission sequence identifier to a voice data segment obtained after processing, where the transmission sequence identifier is for indicating a processing order of the voice data segment.

Step 209: Transmit the voice data segment to a voice server in a network in real time.

In step 201 and step 202, the user may push the voice intercom function button on the voice sending terminal to instruct the voice sending terminal to send a voice message, or may initiate voice intercommunication to the voice sending terminal by using a voice command or in other manners during actual application and send a voice. The instruction command for initiating voice intercommunication is not specifically limited in this embodiment.

In step 202, in the voice signal collection process, the voice sending terminal may temporarily store the collected voice signal in real time, until an voice sending ending instruction, that is, until it is detected that the user stops pushing the voice intercom function button.

In step 203, the voice signal collected in step 202 is encoded and compressed at the same time when the collection of the voice signal is executed in step 202, that is, step 202 and step 203 are executed synchronously.

Persons skilled in the art may understand that the encoding of voice signal is to convert the collected voice signal into a digital signal suitable for transmission over a network; and data obtained after encoding is compressed to reduce a size of voice data transmitted over the network, thereby increasing a voice transmission speed. A specific encoding and compression process is the same as or similar to those in the conventional technology, and are not described herein.

In step 204, the length of data in the compression processing process in step 203 may be detected, so that when the length of the data reaches a preset data length, the compressed data may be used as a voice data segment. The preset data length may be set to an appropriate value according to a need for network transmission. For example, when voice data is transmitted by using the TCP/IP protocol, the preset data length may be set to 1500 bytes, so as to adapt to a limit on a packet length in a lower-level Media Access Control (MAC) protocol, thereby preventing resegmentation and recombination of data exceeding 1500 bytes at a lower-level, reducing operations in the lower-level protocol, and improving efficiency of data transmission. Step 204 and step 203 are also performed synchronously.

In step 205 to step 208, after the collection of the voice signal is ended and collected voice signal has all been processed, a voice end identifier may be added to the last voice data segment obtained after processing, so as to indicate the end of a current voice. In this way, the voice server and the voice receiving terminal can conveniently determine the end of the voice. Persons skilled in the art may understand that during actual application, a voice end instruction may also be sent to the voice server and the voice receiving terminal after the collection of the voice signal is ended, that is, after user A indicates that voice sending is ended, so as to inform that the voice is ended, which is not specifically limited in this embodiment of the present disclosure.

In this embodiment, that the collection of the voice signal is ended refers to that the voice sending terminal stops collection of a voice when receiving a voice sending ending instruction of the user. In this embodiment, when it is detected that the user no longer pushes the voice intercom function button on the voice sending terminal, collection of voice signal is stopped, and at this time it indicates that the voice that the user wants to send is ended.

In step 208, transmission sequence identifiers are added to voice data segments obtained after processing, so as to indicate a processing order, for example, processing sequence numbers, of the voice data segments. In this way, the voice receiving terminal may recombine voice data according to these sequence numbers, thereby obtaining a corresponding complete voice file. Besides, the voice server may also determine, according to the transmission sequence identifiers of received voice data segments, whether a voice data segment to be received is lost or whether the received voice data segments are in an incorrect order.

In step 209, the voice data segment obtained through processing in step 203 may be sent to the voice server in real time. After receiving the voice data segment, the voice server may forward the voice data segment to the voice receiving terminal in real time, so that the voice receiving terminal processes the received voice data segment and plays a finally obtained voice to a user that receives the voice. A specific processing process is described in the following.

In sum, the voice sending terminal starts collecting the voice signal in response to a first user instruction. While collecting the voice signal, the voice sending terminal encodes and compresses the collected voice signal into voice data. The voice sending terminal identifies the voice data as a voice data segment and adds a transmission sequence identifier to the voice data segment when the length of voice data reaches a preset data length, the transmission sequence identifier indicating a processing order of the voice data segment. After sending the voice data segment to the voice server, the voice sending terminal generates and displays a first visual indicator. In some embodiments, the first visual indicator is a length increase to a progressive bar and there is a text label indicating a current length of the progressive bar in time.

The voice sending terminal stops collecting the voice signal in response to a second user instruction. After stopping collecting the voice signal, the voice sending terminal identifies remaining voice data as a last voice data segment and adds a last transmission sequence identifier to the last voice data segment. If the remaining voice data is longer than a preset value, the voice sending terminal divides the remaining voice data into multiple voice data segments and sends them to the voice server one after another one. Finally, the voice sending terminal generates and displays a second visual indicator after sending the last voice data segment to the voice server. In some embodiments, the second visual indicator is a color change to the progressive bar. Note that each of the first and second visual indicators is generated and displayed after receiving an acknowledgement message returned by the voice server upon receipt of a corresponding voice segment. In this case, the acknowledgement message indicates that the voice server has successfully received the corresponding voice segment. In some embodiments, there is an interruption to the communication network between the voice sending terminal and the voice server such that the voice server may not receive a voice segment successfully while the voice sending terminal collects the voice signal. In this case, the voice sending terminal receives transmission feedback information returned by the voice server. The transmission feedback information comprises a transmission sequence identifier and a transmission status, and the transmission sequence identifier identifies a voice data segment that needs to be resent and the transmission status indicates that the voice server fails to receive the voice data segment. In some embodiments, the transmission status is optional because the transmission sequence identifier by itself is used to indicate which voice data segment needs to be resent. In yet another embodiment, the voice sending terminal may still have some voice data that has not been sent to the voice server after the voice sending terminal stops collecting the voice signal. In this case, the voice sending terminal identifies a set of transmission sequence identifiers based on a difference between the last transmission sequence identifier and a transmission sequence identifier last acknowledged by the voice server. This difference can be used to indicate the number of voice data segments that have not been sent to the voice server and their respective transmission sequence identifiers. Using such information, the voice sending terminal then sends the voice data segments corresponding to the set of transmission sequence identifiers to the voice server until the last voice data segment is successfully received by the voice server.

Persons skilled in the art may understand that when the voice data segment is sent, a Transmission Control Protocol (TCP) protocol may be specifically used to send the voice data segment obtained after processing to the voice server in real time, or a User Datagram Protocol (UDP) protocol may be used to send the voice data segment obtained after processing to the voice server in real time, or another transmission protocol may also be used, which is not specifically limited in this embodiment.

Persons skilled in the art may understand that when the voice data segments are sent by using the TCP protocol, transmission sequence identifiers may be not added to the voice data segments, and a sequential arrangement of the voice data segments is ensured through the control relying on the TCP protocol.

Persons skilled in the art may understand that in this embodiment, in the processing process in the voice signal collection process, voice data is processed into multiple data segments, and the data segments are separately sent. In this way, it is unnecessary to send an entire voice file, so that efficiency of sending voice data is higher, real-time quality is improved, and a requirement of instant messaging for real-time quality can be satisfied.

Figure 3:
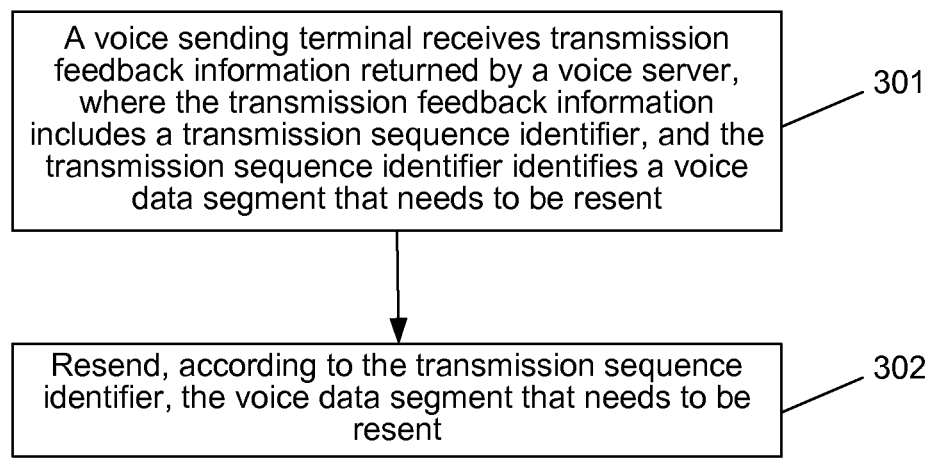
FIG. 3 is a schematic flowchart of voice retransmission in a voice transmission method according to another embodiment of the present disclosure.

FIG. 3 is a schematic flowchart of voice retransmission in a voice transmission method according to another embodiment of the present disclosure. Based on the technical solutions of the foregoing embodiments of the present disclosure, in order to ensure that the voice data segments are sent reliably to the voice server, the voice sending terminal may further retransmit a voice data segment that fails to be sent. Specifically, as shown in FIG. 3, the method of this embodiment may further include the following steps:

Step 301: The voice sending terminal receives transmission feedback information returned by the voice server, where the transmission feedback information includes a transmission sequence identifier, and the transmission sequence identifier identifies a voice data segment that needs to be resent.

Step 302: Resend, according to the transmission sequence identifier, the voice data segment that needs to be resent.

In this embodiment, when the voice server cannot receive a voice data segment and the voice data segment is lost because a network, for example, a mobile communications network, used by the voice sending terminal to transmit the voice data segment has a failure or is unstable, the voice server may return transmission feedback information to the voice sending terminal, so as to indicate, to the voice sending terminal, the voice data segment that needs to be resent. In this way, the voice sending terminal only needs to resend a voice data segment that needs to be resent.

Persons skilled in the art may understand that after sending the voice data segments, the voice sending terminal may temporarily store the voice data segments, so as to perform retransmission when transmission of a voice data segment fails, until the voice server gives feedback that voice transmission is successful. During actual application, a voice data segment that is already sent may be stored according to set time, which is not specifically limited in this embodiment.

In this embodiment, after the collection of the voice signal is ended and voice data segments obtained after processing have all been sent, if the voice sending terminal fails to receive, within a preset time, transmission success information returned by the voice server, the voice sending terminal may resend all the voice data segments. Persons skilled in the art may understand that after voice sending is ended, if no receiving success message fed back by the voice server is received within a long time, it indicates that the server fails to receive the voice; therefore, the voice data is retransmitted to ensure that the voice can be reliably transmitted to the voice sending terminal.

Persons skilled in the art may understand that in an environment of a mobile communications network or another wireless communications network, a failure rate of transmission of voice data is high due to instability of a wireless communications network; during existing voice transmission based on an entire voice file, if transmission of voice data fails in the process, the entire voice file needs to be retransmitted; however, in this embodiment, because voice transmission is based on voice data segments, even if one voice data segment fails to be transmitted in a voice transmission process, only the voice data segment needs to be resent, thereby reducing network resources occupied for retransmission and improving efficiency of voice transmission.

Figure 4:
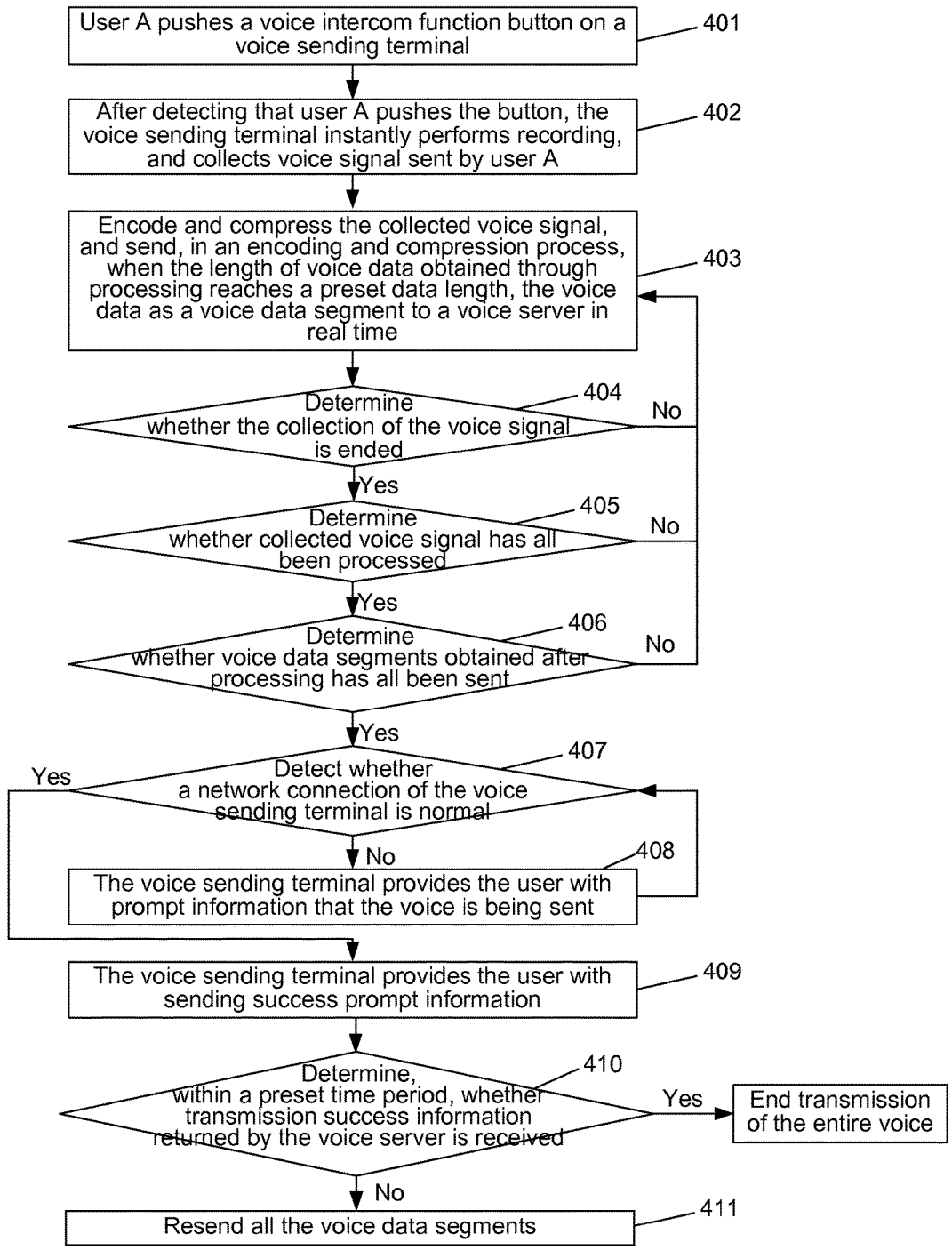
FIG. 4 is a schematic flowchart of a voice transmission method according to another embodiment of the present disclosure.

FIG. 4 is a schematic flowchart of a voice transmission method according to another embodiment of the present disclosure. A difference from the foregoing embodiments of the present disclosure is that in this embodiment, sending success information may be indicated to user A after the collection of the voice signal is ended, so as to improve user experience of the user using voice intercommunication as an instant messaging manner. Specifically, as shown in FIG. 4, the method of this embodiment may include the following steps:

Step 401: User A pushes a voice intercom function button on a voice sending terminal, so as to instruct the voice sending terminal to start to send a voice to a voice receiving terminal.

Step 402: After detecting that user A pushes the button, the voice sending terminal instantly performs recording, and collects voice signal sent by user A.

Step 403: Encode and compress the collected voice signal in a voice signal collection process, and send, in an encoding and compression process, when the length of voice data obtained through processing reaches a preset data length, the voice data as a voice data segment to a voice server in real time.

Step 404: Determine whether the collection of the voice signal is ended; if yes, execute step 405; or otherwise, execute step 403.

Step 405: Determine whether collected voice signal has all been processed; if yes, execute step 406; or otherwise, execute step 403.

Step 406: Determine whether voice data segments obtained after processing have all been sent; if yes, execute step 407; or otherwise, execute step 403.

Step 407: Detect whether a network connection of the voice sending terminal is normal; if yes, execute step 409; or otherwise, execute step 408.

Step 408: The voice sending terminal provides the user with prompt information that the voice is being sent, and continue to execute step 407.

Step 409: The voice sending terminal provides the user with sending success prompt information.

Step 410: Determine, within a preset time period, whether transmission success information returned by the voice server is received; if yes, end transmission of the entire voice; or otherwise, execute step 411.

Step 411: Resend all the voice data segments.

In step 409, after the collection of the voice signal is ended and data has been sent, as long as it is detected a network connection of the voice sending terminal is normal, the voice sending terminal provides the user with sending success prompt information. In this way, it is ensured that the user can better experience real-time quality of instant messaging, and experience of instant messaging of the user is improved.

In step 408, after voice data has been sent, when it is detected that the network connection is abnormal, it indicates that the data is not yet successfully sent to the voice server and the voice receiving terminal. Therefore, the user may be provided with prompt information that the voice is being sent. Besides, during actual application, a certain time length, for example, 1 minute, may be further set, and if it is detected within the time period that the network connection is still abnormal, the user may be provided with prompt information indicating that the voice fails to be sent or the like.

In step 410 and step 411, after the collection of the voice signal is ended and the user is provided with a sending success prompt, it is detected whether the voice server returns transmission success confirmation information to ensure that the voice data is reliably sent to the voice server, thereby effectively improving reliability of voice data sending.

In the existing technology, a voice sending terminal usually provides a user with a sending success prompt after receiving sending success confirmation information fed back by a voice server, or continues to wait if no sending success confirmation information is received. During voice intercommunication, the voice sending terminal sends, based on a mobile communications network or another wireless network, voice data to the voice server. A wireless network has a far more complex environment than a wired network does, and uplink and downlink bandwidths of the voice sending terminal are severely asymmetrical, and therefore in an environment of a wireless network with a low signal-to-noise ratio, a certain proportion of signaling data between the voice sending terminal and the voice server is lost. In this case, real voice data is already sent, but because the sending success confirmation information fed back by the voice server is delayed, the voice sending terminal cannot provide the user with the success information for a long time, which severely affects experience of a service of voice intercommunication. Therefore, in this embodiment, a process for indicating successful sending of a voice is optimized, and experience of a user using instant messaging can be effectively improved.

Figure 5:
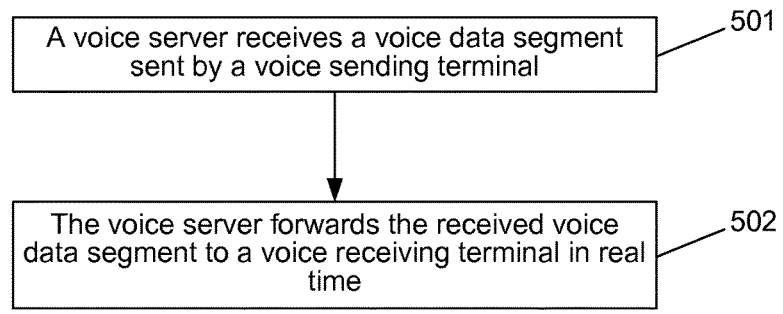
FIG. 5 is a schematic flowchart of a voice transmission method according to another embodiment of the present disclosure.

FIG. 5 is a schematic flowchart of a voice transmission method according to Embodiment 5 of the present disclosure. In this embodiment, a voice server may receive, in real time, a voice data segment sent by the voice sending terminal in the foregoing method embodiment of the present disclosure, and may forward the voice data segment to a voice receiving terminal in real time. Specifically, as shown in FIG. 5, the method of this embodiment may include the following steps:

Step 501: A voice server receives a voice data segment sent by a voice sending terminal.

Step 502: The voice server forwards the received voice data segment to a voice receiving terminal in real time.

In this embodiment, the voice server may receive, in real time, a voice data segment sent by the voice sending terminal according to FIG. 1 to FIG. 4, and may forward the voice data segment to a voice receiving terminal in real time, so as to improve efficiency of transmission of voice data.

In this embodiment, when the voice server fails to receive a voice data segment, and the voice data segment is lost, the voice server may return transmission feedback information to the voice sending terminal, where the transmission feedback information may include a transmission sequence identifier for indicating a voice data segment that needs to be resent, so that the voice sending terminal resends, according to the transmission sequence identifier, the voice data segment that needs to be resent. For a specific processing process, reference may be made to the description of the foregoing method shown in FIG. 3.

Figure 6:
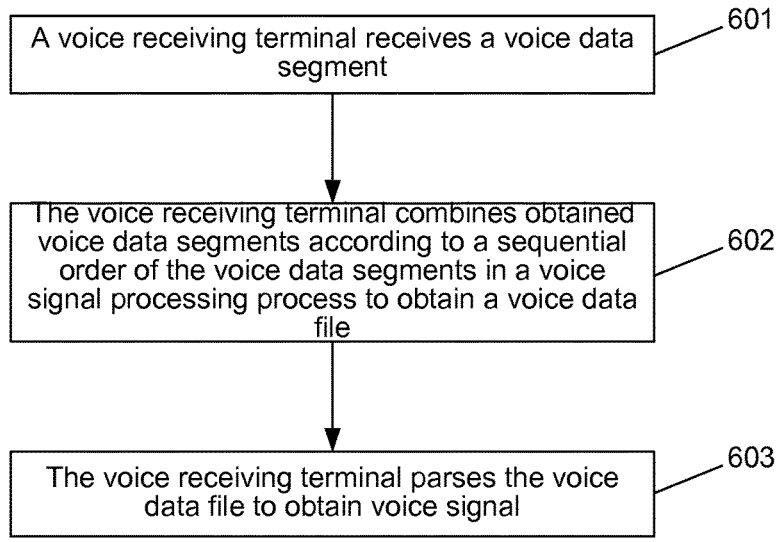
FIG. 6 is a schematic flowchart of a voice transmission method according to another embodiment of the present disclosure.

FIG. 6 is a schematic flowchart of a voice transmission method according to Embodiment 6 of the present disclosure. In this embodiment, a voice receiving terminal may receive, in real time, a voice data segment forwarded in real time by the voice server in the method of the foregoing embodiment shown in FIG. 5. Specifically, as shown in FIG. 6, this embodiment of the present disclosure may include the following steps:

Step 601: A voice receiving terminal receives a voice data segment.

Step 602: The voice receiving terminal combines obtained voice data segments according to a sequential order of the voice data segments in a voice signal processing process to obtain a voice data file.

Step 603: The voice receiving terminal parses the voice data file to obtain voice signal.

In this embodiment, the voice receiving terminal may receive, in real time, a voice data segment sent by the voice sending terminal in FIG. 1 to FIG. 4 and forwarded by a voice server, and may combine received voice data segments to obtain a complete voice file, and parse the voice file, to obtain corresponding voice signal and play the voice signal to a user.

In this embodiment, the voice receiving terminal may specifically combine the received voice data segments after receiving a voice data segment carrying a voice end identifier, to obtain the voice data file.

In this embodiment, when combining the received voice data segments, the voice receiving terminal may specifically combine the voice data segments in a processing order according to the transmission sequence identifiers carried in the voice data segments, to obtain the voice data file.

Persons skilled in the art may understand that in all the foregoing embodiments, when a voice is sent, the voice needs to be forwarded as voice data by a voice server; during actual application, in the case of direction communication between mobile terminals, a voice may also be sent or received in the foregoing manner, which is not specifically limited in this embodiment of the present disclosure. For example, when two mobile terminals in a same communications network perform voice intercommunication directly, one mobile terminal may directly send an intercom voice to the other mobile terminal in the foregoing manner of collection, processing, and transmission of a voice.

Persons of ordinary skill in the art may understand that all or some of the steps of the foregoing method embodiments may be implemented by a program instructing relevant hardware. The program may be stored in a computer readable storage medium. When the program is run, the steps of the foregoing method embodiments are executed. The storage medium may be any medium that is capable of storing program code, such as a ROM, a RAM, a magnetic disk, or an optical disc.

Figure 7:
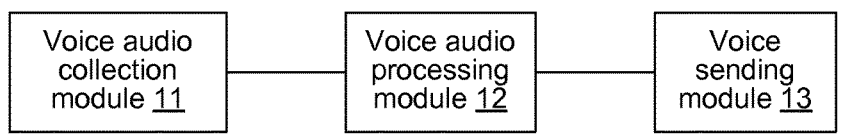
FIG. 7 is a schematic structural diagram of a voice transmission terminal according to an embodiment of the present disclosure.

FIG. 7 is a schematic structural diagram of a voice transmission terminal according to an embodiment of the present disclosure. The voice transmission terminal in this embodiment may be the voice sending terminal in the foregoing method embodiment of the present disclosure, so as to perform voice sending. Specifically, as shown in FIG. 7, the voice transmission terminal in this embodiment includes a voice signal collection module 11, a voice signal processing module 12, and a voice sending module 13, where:

the voice signal collection module 11 is configured to collect voice signal;

the voice signal processing module 12 is configured to process the collected voice signal in a voice signal collection process; and the voice sending module 13 is configured to send, in a voice signal processing process, when the length of voice data obtained through processing reaches a preset data length, the voice data as a voice data segment.

The voice transmission terminal in this embodiment may perform voice sending based on the method embodiment shown in FIG. 1, FIG. 2, FIG. 3, or FIG. 4. For specific implementation, reference may be made to the description of the foregoing method embodiment of the present disclosure, which is not described repeatedly herein.

Figure 8:
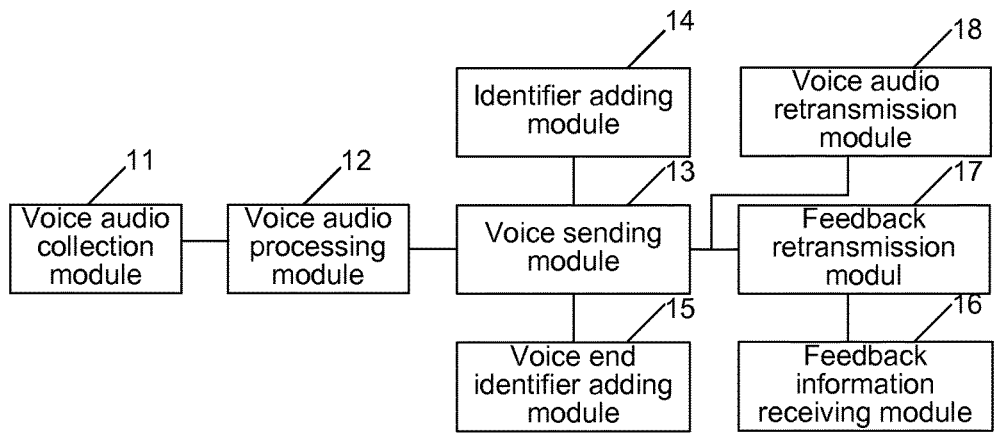
FIG. 8 is a schematic structural diagram of a voice transmission terminal according to another embodiment of the present disclosure.

FIG. 8 is a schematic structural diagram of a voice transmission terminal according to another embodiment of the present disclosure. Based on the embodiment shown in FIG. 7, as shown in FIG. 8, the voice transmission terminal in this embodiment may further include an identifier adding module 14 and a voice end identifier adding module 15, where the identifier adding module 14 may be configured to add a transmission sequence identifier to the voice data segment sent by the voice sending module 13, where the transmission sequence identifier indicates a processing order of the voice data segment in the voice signal processing process; and the voice end identifier adding module 15 may be configured to add, after the collection of the voice signal is ended, a voice end identifier to the last voice data segment obtained through processing.

As shown in FIG. 8, the voice transmission terminal in this embodiment may further include a feedback information receiving module 16 and a feedback retransmission module 17, where the feedback information receiving module 16 may be configured to receive transmission feedback information returned by a voice server, where the transmission feedback information includes a transmission sequence identifier, and the transmission sequence identifier identifies a voice data segment that needs to be resent; and the feedback retransmission module 17 may be configured to resend, according to the transmission sequence identifier, the voice data segment that needs to be resent.

Further, as shown in FIG. 8, the voice transmission terminal in this embodiment may further include a voice signal retransmission module 18, where the voice signal retransmission module 18 may be configured to resend, after the collection of the voice signal is ended and the voice data segments obtained after processing have all been sent, when no transmission success information returned by the voice server is received within a preset time period, all voice data segments in the voice signal processing process.

The voice transmission terminal in this embodiment may implement voice sending based on the method embodiment shown in FIG. 2 or FIG. 3. For specific implementation, reference may be made to the description of the foregoing method embodiment of the present disclosure, which is not described repeatedly herein.

Figure 9:
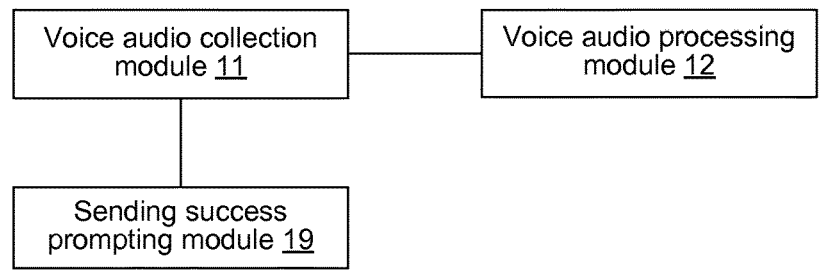
FIG. 9 is a schematic structural diagram of a voice transmission terminal according to another embodiment of the present disclosure.

FIG. 9 is a schematic structural diagram of a voice transmission terminal according to an embodiment of the present disclosure. Based on the technical solutions of the foregoing embodiment shown in FIG. 7 or FIG. 8, as shown in FIG. 9, this embodiment may further include a sending success prompting module 19, configured to provide, after the collection of the voice signal is ended, when it is detected that a network connection is normal, a user with sending success prompt information.

The voice transmission terminal in this embodiment may implement voice sending based on the method embodiment shown in FIG. 4. For specific implementation, reference may be made to the description of the foregoing method embodiment of the present disclosure, which is not described repeatedly herein.

Figure 10:
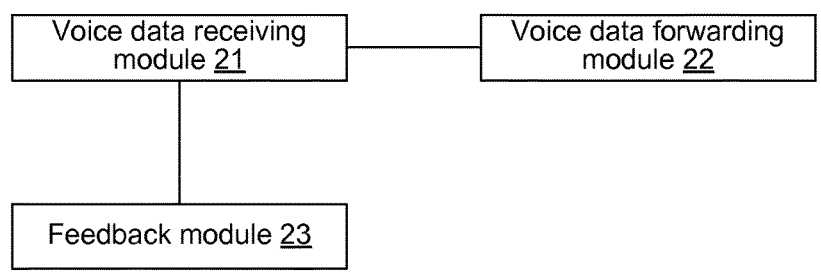
FIG. 10 is a schematic structural diagram of a voice server according to an embodiment of the present disclosure.

FIG. 10 is a schematic structural diagram of a voice server according to an embodiment of the present disclosure. As shown in FIG. 10, the voice server in this embodiment includes a voice data receiving module 21 and a voice data forwarding module 22, where:

the voice data receiving module 21 is configured to receive a voice data segment sent by a voice sending terminal; and the voice data forwarding module 22 is configured to forward the received voice data segment to a voice receiving terminal in real time.

As shown in FIG. 10, the voice server in this embodiment may further include a feedback module 23, configured to return, when the voice data segment fails to be received, transmission feedback information to the voice sending terminal, where the transmission feedback information includes a transmission sequence identifier, and the transmission sequence identifier identifies a voice data segment that needs to be resent, so that the voice sending terminal resends the voice data segment that needs to be resent.

The voice server in this embodiment may process, based on the method embodiment shown in FIG. 5, the voice data segment sent by the voice transmission terminal shown in FIG. 7, FIG. 8, or FIG. 9. For specific implementation, reference may be made to the description of the foregoing method embodiment, which is not described repeatedly herein.

Figure 11:
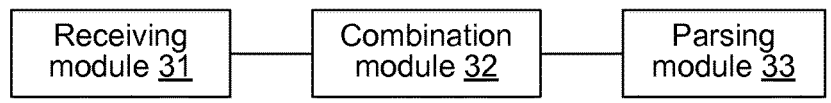
FIG. 11 is a schematic structural diagram of a voice transmission terminal according to an embodiment of the present disclosure.

FIG. 11 is a schematic structural diagram of a voice transmission terminal according to an embodiment of the present disclosure. The voice transmission terminal in this embodiment may be a voice receiving terminal, and receive a voice data segment sent by the foregoing voice server or voice sending terminal. Specifically, as shown in FIG. 11, the voice transmission terminal in this embodiment may include a receiving module 31, a combination module 32, and a parsing module 33, where:

the receiving module 31 is configured to receive a voice data segment;

the combination module 32 is configured to combine obtained voice data segments according to a sequential order of the voice data segments in a voice signal processing process to obtain a voice data file; and the parsing module 33 is configured to parse the voice data file to obtain voice signal.

In this embodiment, each voice data segment carries a transmission sequence identifier for indicating a processing order of the voice data segment; and the combination module 32 is specifically configured to combine the voice data segments in the processing order according to the transmission sequence identifiers carried in the voice data segments, to obtain the voice data file.

Besides, the last voice data segment sent by the voice sending terminal carries a voice end identifier; and the combination module 32 is specifically configured to combine, after the voice data segment carrying the voice end identifier is received, the received voice data segments to obtain the voice data file.

The voice transmission terminal in this embodiment may be a voice receiving terminal, and process the received voice data segment based on the method in Embodiment 6 of the present disclosure. For specific implementation, reference may be made to the description of the foregoing method embodiment of the present disclosure, which is not described repeatedly herein.

Figure 12:
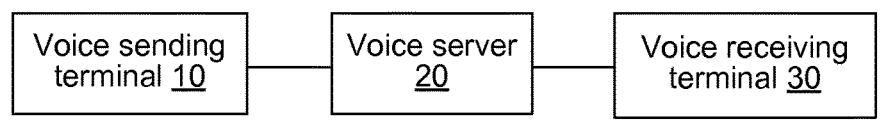
FIG. 12 is a schematic structural diagram of a voice transmission system according to another embodiment of the present disclosure.

FIG. 12 is a schematic structural diagram of a voice transmission system according to an embodiment of the present disclosure. As shown in FIG. 12, the system in this embodiment includes a voice sending terminal 10 and a voice receiving terminal 30 as mobile terminals and a voice server 20. Both the voice sending terminal 10 and the voice receiving terminal 30 communicate with the voice server 20 through a mobile communications network. The voice sending terminal 10 may specifically be the voice transmission terminal shown in FIG. 6, FIG. 7, or FIG. 8, the voice receiving terminal 30 may be the voice transmission terminal shown in FIG. 11, and the voice server 20 may specifically be the voice server shown in FIG. 10. For a specific structure and working process, reference may be made to the foregoing apparatus embodiment of the present disclosure, which is not described repeatedly herein.

Figure 13:
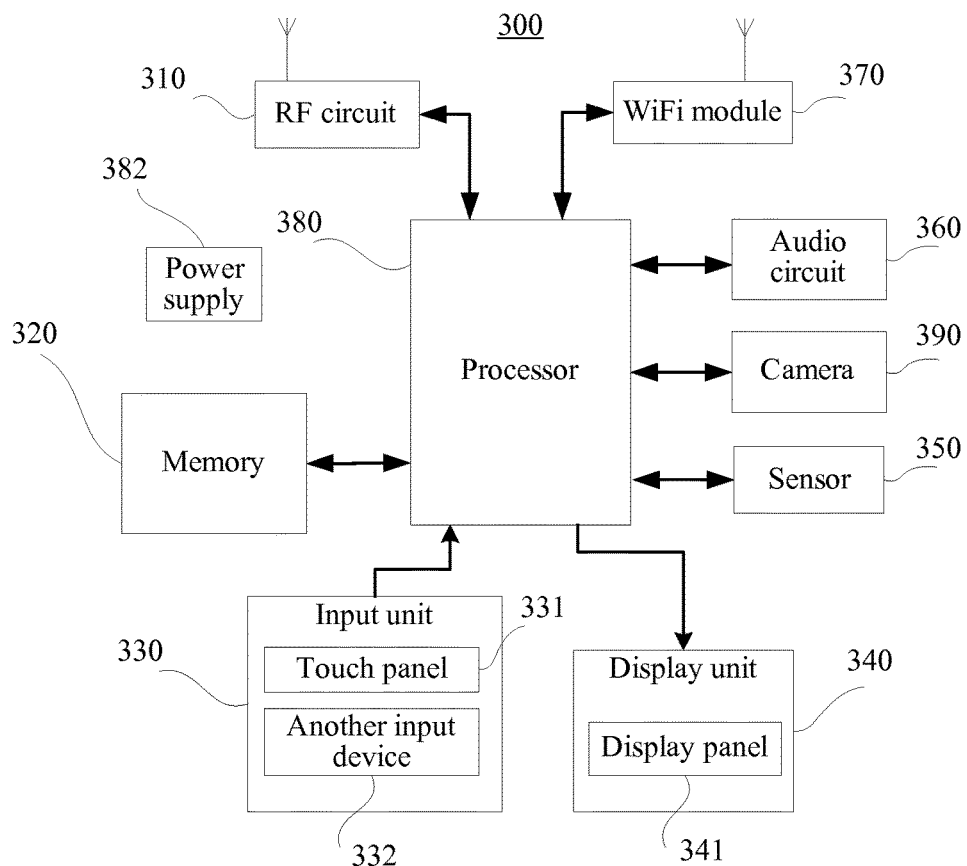
FIG. 13 is a schematic structural diagram of a voice transmission terminal according to an embodiment of the present disclosure.

FIG. 13 is a structural block diagram of a voice transmission terminal according to an embodiment of the present disclosure. The voice transmission terminal is configured to implement the voice transmission method provided by the foregoing embodiment. The voice transmission terminal in this embodiment of the present disclosure may include one or more of the following components: a processor configured to execute a computer program instruction to complete processes and a method, a random access memory (RAM) and a read-only memory (ROM) that are configured to store information and a program instruction, memory configured to store data and information, an I/O device, an interface, and an antenna. Specifically, the voice transmission terminal 300 may include components such as a Radio Frequency (RF) circuit 310, a memory 320, an input unit 330, a display unit 340, a sensor 350, an audio circuit 360, a Wireless Fidelity (WiFi) module 370, a processor 380, a power supply 382, and a camera 390. Persons skilled in the art may understand that the structure of the terminal shown in FIG. 13 does not constitute a limitation to the voice transmission terminal, and the voice transmission terminal may include more components or fewer components than those shown in the figure, or some components may be combined, or a different component deployment may be used.

The following specifically describes the components of the voice transmission terminal 300 with reference to FIG. 13.

The RF circuit 310 may be configured to receive and send signals during an information receiving and sending process or a call process. Particularly, the RF circuit 310 receives downlink information from a base station, then delivers the downlink information to the processor 380 for processing, and sends designed uplink data to the base station. Generally, the RF circuit includes, but is not limited to, an antenna, at least one amplifier, a transceiver, a coupler, a low noise amplifier (LNA), and a duplexer. In addition, the RF circuit 310 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 320 may be configured to store a software program and module. The processor 380 runs the software program and module stored in the memory 320, to implement various functional applications and data processing of the voice transmission terminal 300. The memory 320 may mainly include a program storage area and a data storage area. The program storage area may store an operating system, an application program required by at least one function (such as a sound playback function and an image display function), and the like. The data storage area may store data (such as audio data and an address book) created according to use of the terminal 300, and the like. In addition, the memory 320 is a non-transitory computer readable storage medium including a high speed random access memory, and may also include a non-volatile memory such as at least one magnetic disk storage device, a flash memory, or another volatile solid-state storage device.

The input unit 330 may be configured to receive input digit or character information, and generate a keyboard signal input related to the user setting and function control of the voice transmission terminal 300. Specifically, the input unit 330 may include a touch panel 331 and another input device 332. The touch panel 331, which may also be referred to as a touch screen, may collect a touch operation of a user on or near the touch panel (such as an operation of a user on or near the touch panel 331 by using any suitable object or accessory such as a finger or a stylus), and drive a corresponding connection apparatus according to a preset program. Optionally, the touch panel 331 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 380. Moreover, the touch controller can receive and execute a command sent from the processor 380. In addition, the touch panel 331 may be a resistive, capacitive, infrared, or surface sound wave type touch panel. In addition to the touch panel 331, the input unit 330 may further include the another input device 332. Specifically, the another input device 332 may include, but is not limited to, one or more of a physical keyboard, a functional button (such as a volume control button or a switch button), a track ball, a mouse, and a joystick.

The display unit 340 may be configured to display information input by the user or information provided for the user, and various menus of the voice transmission terminal 300. The display unit 340 may include a display panel 341. Optionally, the display panel 341 may be configured by using a liquid crystal display (LCD), an organic light-emitting diode (OLED), or the like. Further, the touch panel 331 may cover the display panel 341. After detecting a touch operation on or near the touch panel 331, the touch panel 331 transfers the touch operation to the processor 380, so as to determine the type of the touch event. Then, the processor 380 provides a corresponding visual output on the display panel 341 according to the type of the touch event. Although, in FIG. 13, the touch panel 331 and the display panel 341 are used as two separate parts to implement input and output functions of the voice transmission terminal 300, in some embodiments, the touch panel 331 and the display panel 341 may be integrated to implement the input and output functions of the voice transmission terminal 300.

The voice transmission terminal 300 may further include at least one sensor 350 such as a gyroscope sensor, a magnetic induction sensor, an optical sensor, a motion sensor, and other sensors. Specifically, the optical sensor may include an ambient light sensor and a proximity sensor. The ambient light sensor may adjust luminance of the display panel 341 according to brightness of the ambient light. The proximity sensor may switch off the display panel 341 and/or backlight when the terminal 350 is moved to the ear. As one type of motion sensor, an acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (such as a pedometer and a knock), and the like. Other sensors such as a barometer, a hygrometer, a thermometer, and an infrared sensor, which may be configured in the voice transmission terminal 300, are not further described herein.

The audio circuit 360, a loudspeaker 361, and a microphone 362 may provide audio interfaces between the user and the voice transmission terminal 300. The audio circuit 360 may convert received audio data into an electric signal and transmit the electric signal to the loudspeaker 361. The loudspeaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another terminal by using the RF circuit 310, or outputs the audio data to the memory 320 for further processing.

WiFi is a short distance wireless transmission technology. The voice transmission terminal 300 may help, by using the WiFi module 370, the user to receive and send e-mails, browse a webpage, access streaming media, and so on, which provides the user with wireless broadband Internet access. Although FIG. 13 shows the WiFi module 370, it may be understood that the WiFi module is not a necessary component of the voice transmission terminal 300, and when required, the WiFi module may be omitted as long as the scope of the essence of the present disclosure is not changed.

The processor 380 is the control center of the voice transmission terminal 300, and is connected to various parts of the terminal by using various interfaces and lines. By running or executing the software program and/or module stored in the memory 320, and invoking data stored in the memory 320, the processor 180 performs various functions and data processing of the voice transmission terminal 300, thereby performing overall monitoring on the terminal. Optionally, the processor 380 may include one or more processing units. Preferably, the processor 380 may integrate an application processor and a modem. The application processor mainly processes an operating system, a user interface, an application program, and the like. The modem mainly processes wireless communication. It may be understood that the foregoing modem may also not be integrated into the processor 380.

The voice transmission terminal 300 further includes the power supply 382 (such as a battery) for supplying power to the components. Preferably, the power supply may be logically connected to the processor 382 by using a power management system, thereby implementing functions such as charging, discharging and power consumption management by using the power management system.

The camera 390 generally includes a lens, an image sensor, an interface, a digital signal processor, a CPU, and a display screen. The lens is secured above the image sensor, and focus may be adjusted by manually adjusting the lens; the image sensor is equivalent to a "film" of a traditional camera, and is the core of the camera collecting an image; the interface is configured to connect the camera and a main board of the terminal by using a flat cable, a board-to-board connector, a spring or in another connection manner, and send a collected image to the memory 320; and the digital signal processor processes the collected image by performing a mathematical operation, converts a collected analog image into a digital image, and sends the digital image to the memory 320 through the interface.

Although not shown in the figure, the voice transmission terminal 300 may further include a Bluetooth module and the like, which are not further described herein.

In addition to the one or more processors 380, the voice transmission terminal 300 further includes a memory 320. The memory 320 stores one or more program modules, the one or more program modules are configured to be executed by the one or more processors 380, and the one or more program modules are for executing the voice transmission method shown in FIG. 1, FIG. 2, FIG. 3, FIG. 4, or FIG. 6.

Figure 14:
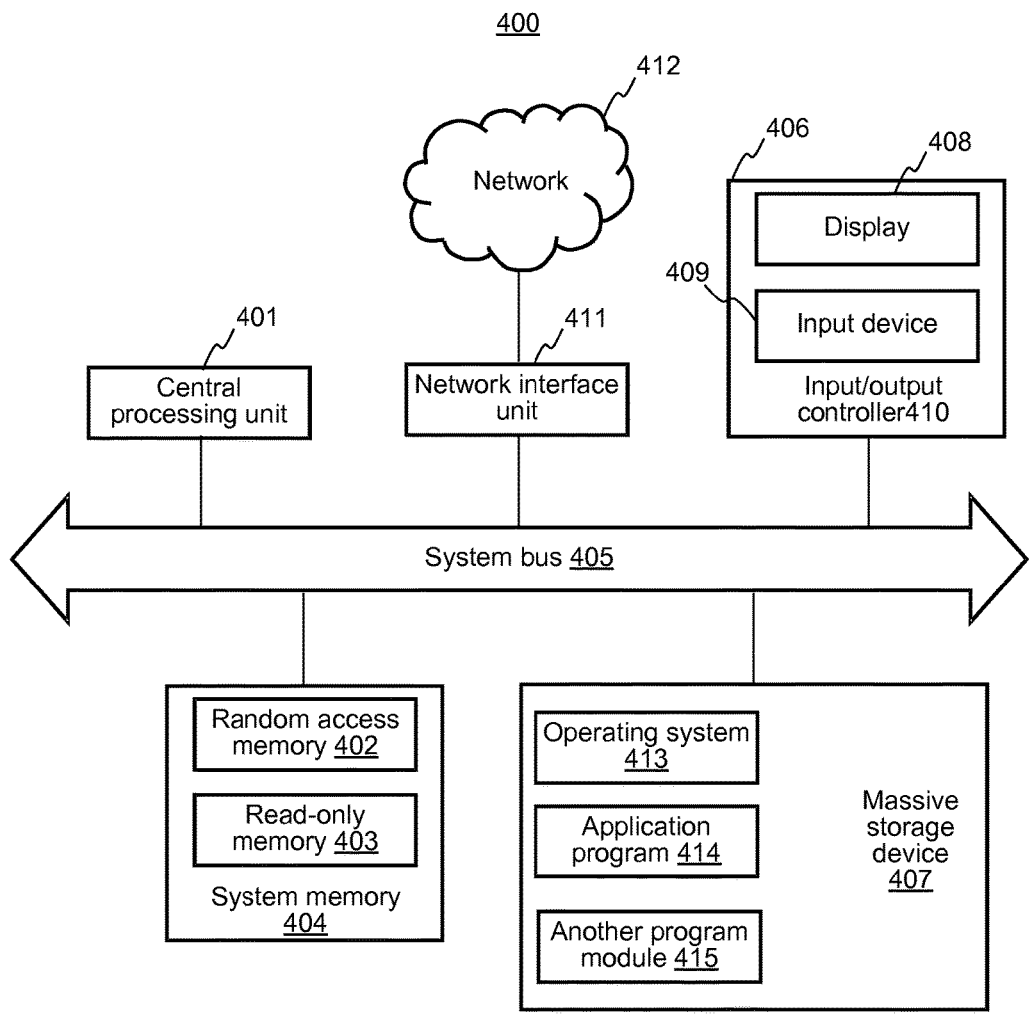
FIG. 14 is a schematic structural diagram of a voice server according to another embodiment of the present disclosure.

FIG. 14 is a schematic structural diagram of a voice server according to an embodiment of the present disclosure. The voice server 400 includes a central processing unit (CPU) 401, a system memory 404 including a RAM 402 and a ROM 403, and a system bus 405 connecting the system memory 404 and the CPU 401. The voice server 400 further includes a basic input/output system (I/O system) 406 helping information transmission between components in a computer, and a massive storage device 407 configured to store an operating system 413, an application program 414, and another program module 415.

The basic I/O system 406 includes a display 408 configured to display information and an input device 409, such as a mouse and a keyboard, used by a user to input information. The display 408 and the input device 409 are connected to the CPU 401 by using an input/output controller 410 connected to the system bus 405. The basic I/O system 406 may further include the input/output controller 410, so as to receive and process input of multiple other devices such as the keyboard, the mouse, and an electronic stylus. Similarly, the input/output controller 410 further provides output to a display screen, a printer, or an output device of another type.

The massive storage device 407 is connected to the CPU 401 by using a massive storage controller (not shown in the figure) connected to the system bus 405. The massive storage device 407 and an associated non-transitory computer readable medium provide non-volatile storage for the voice server 400. That is, the massive storage device 407 may include a non-transitory computer readable medium (not shown in the figure) such as a hard disk or a CD-ROM drive.

Without loss of generality, the non-transitory computer readable medium may include a computer storage medium and a communication medium. The computer storage medium includes volatile and non-volatile, removable and non-removable media implemented by using any method or technology and configured to store information such as a computer readable instruction, a data structure, a program module, or other data. The computer storage medium includes a RAM, a ROM, an EPROM, an EEPROM, a flash memory, or another solid storage technology, and a CD-ROM, a DVD, or another optical storage, and a cassette, a type, magnetic storage, or another magnetic storage device. Certainly, persons skilled in the art may know that the computer storage medium is not limited to the foregoing. The system memory 404 and the massive storage device 407 may be generally referred to as a memory.

According to various embodiments of the present disclosure, the voice server 400 may be run by using a remote computer connected to on a network by using a network such as the Internet. That is, the voice server 400 may be connected to a network 412 by using a network interface unit 411 connected to the system bus 405, or the voice server 400 may be connected to a network of another type or a remote computer system (not shown in the figure) by using a network interface unit 411.

The memory further includes one or more program modules. The one or more program modules are stored in the memory, and are configured to be executed by one or more CPUs 401. The one or more program modules are for executing the voice transmission method provided by the embodiment shown in FIG. 5.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present disclosure.

What is claimed is:

1. A real-time voice transmission method, comprising:
at a mobile terminal having one or more processors and memory storing program modules to be executed by the one or more processors:
starting collecting voice signal in response to a first user instruction from a user of the mobile terminal;
while collecting the voice signal:
encoding and compressing the collected voice signal into voice data;
identifying the voice data as a voice data segment and adding a transmission sequence identifier to the voice data segment when the length of voice data reaches a preset data length, wherein the transmission sequence identifier indicates a processing order of the voice data segment;
generating and displaying a first visual indicator after sending the voice data segment to a voice server;
stopping collecting the voice signal in response to a second user instruction from the user of the mobile terminal;
identifying remaining voice data as a last voice data segment and adding a last transmission sequence identifier to the last voice data segment; and
generating and displaying a second visual indicator after sending the last voice data segment to the voice server,
wherein each of the first and second visual indicators is generated and displayed after receiving an acknowledgement message returned by the voice server upon receipt of a corresponding voice segment.

2. The method according to claim 1, wherein the first visual indicator is a length increase to a progressive bar and the second visual indicator is a color change to the progressive bar.

3. The method according to claim 2, wherein there is a text label indicating a current length of the progressive bar in time.

4. The method according to claim 1, further comprising:
while collecting the voice signal:
receiving transmission feedback information returned by the voice server, wherein the transmission feedback information comprises a transmission sequence identifier and a transmission status, and the transmission sequence identifier identifies a voice data segment that needs to be resent and the transmission status indicates that the voice server fails to receive the voice data segment; and
resending the voice data segment corresponding to the transmission sequence identifier to the voice server.

5. The method according to claim 1, further comprising:
after stopping collecting the voice signal:
identifying a set of transmission sequence identifiers based on a difference between the last transmission sequence identifier and a transmission sequence identifier last acknowledged by the voice server; and
sending voice data segments corresponding to the set of transmission sequence identifiers to the voice server.

6. A mobile terminal, comprising:
one or more processors; and
memory,
one or more program modules being stored in the memory, the one or more program modules being configured to be executed by the one or more processors, and the one or more program modules comprising instructions used for performing the following operations:
starting collecting voice signal in response to a first user instruction from a user of the mobile terminal;
while collecting the voice signal:
encoding and compressing the collected voice signal into voice data;
identifying the voice data as a voice data segment and adding a transmission sequence identifier to the voice data segment when the length of voice data reaches a preset data length, wherein the transmission sequence identifier indicates a processing order of the voice data segment;
generating and displaying a first visual indicator after sending the voice data segment to a voice server;
stopping collecting the voice signal in response to a second user instruction from the user of the mobile terminal;
identifying remaining voice data as a last voice data segment and adding a last transmission sequence identifier to the last voice data segment; and
generating and displaying a second visual indicator after sending the last voice data segment to the voice server,
wherein each of the first and second visual indicators is generated and displayed after receiving an acknowledgement message returned by the voice server upon receipt of a corresponding voice segment.

7. The mobile terminal according to claim 6, wherein the first visual indicator is a length increase to a progressive bar and the second visual indicator is a color change to the progressive bar.

8. The mobile terminal according to claim 7, wherein there is a text label indicating a current length of the progressive bar in time.

9. The mobile terminal according to claim 6, wherein the one or more program modules further comprise instructions used for performing the following operations:
while collecting the voice signal:
receiving transmission feedback information returned by the voice server, wherein the transmission feedback information comprises a transmission sequence identifier and a transmission status, and the transmission sequence identifier identifies a voice data segment that needs to be resent and the transmission status indicates that the voice server fails to receive the voice data segment; and
resending the voice data segment corresponding to the transmission sequence identifier to the voice server.

10. The mobile terminal according to claim 6, wherein the one or more program modules further comprise instructions used for performing the following operations:
after stopping collecting the voice signal:
identifying a set of transmission sequence identifiers based on a difference between the last transmission sequence identifier and a transmission sequence identifier last acknowledged by the voice server; and
sending voice data segments corresponding to the set of transmission sequence identifiers to the voice server.

11. A non-transitory computer readable storage medium storing one or more program modules to be executed by one or more processors of a mobile terminal, the one or more program modules comprising instructions used for performing the following operations:

starting collecting voice signal in response to a first user instruction from a user of the mobile terminal;

while collecting the voice signal:

encoding and compressing the collected voice signal into voice data;

identifying the voice data as a voice data segment and adding a transmission sequence identifier to the voice data segment when the length of voice data reaches a preset data length, wherein the transmission sequence identifier indicates a processing order of the voice data segment;

generating and displaying a first visual indicator after sending the voice data segment to a voice server;

stopping collecting the voice signal in response to a second user instruction from the user of the mobile terminal;

identifying remaining voice data as a last voice data segment and adding a last transmission sequence identifier to the last voice data segment; and generating and displaying a second visual indicator after sending the last voice data segment to the voice server, wherein each of the first and second visual indicators is generated and displayed after receiving an acknowledgement message returned by the voice server upon receipt of a corresponding voice segment.

12. The non-transitory computer readable storage medium according to claim 11, wherein the first visual indicator is a length increase to a progressive bar and the second visual indicator is a color change to the progressive bar.

13. The non-transitory computer readable storage medium according to claim 12, wherein there is a text label indicating a current length of the progressive bar in time.

14. The non-transitory computer readable storage medium according to claim 11, wherein the one or more program modules further comprise instructions used for performing the following operations:

while collecting the voice signal:

receiving transmission feedback information returned by the voice server, wherein the transmission feedback information comprises a transmission sequence identifier and a transmission status, and the transmission sequence identifier identifies a voice data segment that needs to be resent and the transmission status indicates that the voice server fails to receive the voice data segment; and resending the voice data segment corresponding to the transmission sequence identifier to the voice server.

15. The non-transitory computer readable storage medium according to claim 11, wherein the one or more program modules further comprise instructions used for performing the following operations:

after stopping collecting the voice signal:

identifying a set of transmission sequence identifiers based on a difference between the last transmission sequence identifier and a transmission sequence identifier last acknowledged by the voice server; and sending voice data segments corresponding to the set of transmission sequence identifiers to the voice server.

* * * * *